(12) United States Patent
Qin et al.

(10) Patent No.: US 9,627,934 B2
(45) Date of Patent: Apr. 18, 2017

(54) ROTOR WINDINGS FOR DC MOTOR

(71) Applicant: Johnson Electric S.A., Murten (CH)

(72) Inventors: Rui Feng Qin, Hong Kong (CN); Fei Liu, Shenzhen (CN); Ji Yu Liang, Shenzhen (CN); Shu Hai Yuan, Shenzhen (CN); Xin Hui Guan, Shenzhen (CN)

(73) Assignee: Johnson Electric S.A., Murten (CH)

( * ) Notice: Subject to any disclaimer, the term of this patent is extended or adjusted under 35 U.S.C. 154(b) by 591 days.

(21) Appl. No.: 14/168,618

(22) Filed: Jan. 30, 2014

(65) Prior Publication Data

US 2014/0210299 A1 Jul. 31, 2014

(30) Foreign Application Priority Data

Jan. 30, 2013 (CN) .......................... 2013 1 0035210

(51) Int. Cl.
*H02K 3/28* (2006.01)
*H02K 3/12* (2006.01)
*H02K 23/08* (2006.01)
*H02K 13/04* (2006.01)
*H02K 23/38* (2006.01)

(52) U.S. Cl.
CPC ............. *H02K 3/28* (2013.01); *H02K 3/12* (2013.01); *H02K 13/04* (2013.01); *H02K 23/08* (2013.01); *H02K 23/38* (2013.01)

(58) Field of Classification Search
CPC ........ H02K 23/08; H02K 23/30; H02K 23/38; H02K 23/00; H02K 23/28; H02K 23/04; H02K 3/20; H02K 3/28; H02K 3/12; H02K 13/006; H02K 13/04
USPC ......................... 310/204, 197, 198, 208, 140
See application file for complete search history.

(56) References Cited

U.S. PATENT DOCUMENTS

| | | | |
|---|---|---|---|
| 7,821,170 B2 | 10/2010 | Qin et al. | |
| 2002/0047425 A1* | 4/2002 | Coupart | B66D 1/12 310/156.01 |

FOREIGN PATENT DOCUMENTS

| | | |
|---|---|---|
| JP | 2008113485 | 5/2008 |
| JP | 2009027829 A | * 2/2009 |

OTHER PUBLICATIONS

Shioda Naoki; Yasunaka Tomohiko; Kawashima Yoshichika, Electric Motor and Coil Winding Method of Electric Motor, May 5, 2009, Mitsuba Corp, JP 2009027829 (English Machine Translation).*

* cited by examiner

*Primary Examiner* — Terrance Kenerly
*Assistant Examiner* — Alexander Singh
(74) *Attorney, Agent, or Firm* — Muncy, Geissler, Olds & Lowe, P.C.

(57) ABSTRACT

A commutated DC motor (10) includes a stator (12) and a rotor (14) mounted in the stator (12). The stator (12) has 2P magnetic poles, wherein P is an integer greater than 1. The rotor (14) includes a rotor shaft (81) with a rotor core (85), and a commutator (83) fixed thereto. The rotor core (85) has multiple teeth defining m×P slots therebetween, wherein m is an odd integer greater than 1. The commutator (83) has k×m×P segments, wherein k is 1 or 2. A rotor winding (87) formed by winding a single continuous wire is received in the slots of the rotor core (85) and connected to the segments of the commutator (83), and has k×m winding units. Each winding unit includes P coils in series connection and is directly connected to only two segments.

17 Claims, 4 Drawing Sheets

| Segment | Winding tooth | Form coil | Winding tooth | Form coil | Winding tooth | Form coil | Segment | Winding direction | Winding Unit |
|---|---|---|---|---|---|---|---|---|---|
| K1(start) | T1 | C1 | T7 | C7 | T4 | C4 | K8 | CW | WA |
| K8 | T3 | C3' | T6 | C6' | T9 | C9' | K15 | CCW | WB' |
| K15 | T8 | C8 | T5 | C5 | T2 | C2 | K4 | CW | WC |
| K4 | T1 | C1' | T4 | C4' | T7 | C7' | K11 | CCW | WA' |
| K11 | T6 | C6 | T3 | C3 | T9 | C9 | K18 | CW | WB |
| K18 | T8 | C8' | T2 | C2' | T5 | C5' | K7(end) | CCW | WC' |

ROTOR WINDINGS FOR DC MOTOR

CROSS REFERENCE TO RELATED APPLICATIONS

This application claims the benefit of Chinese Patent Application Serial No.201310035210.X filed on Jan. 30, 2013. The entire content of the aforementioned patent application is hereby incorporated by reference for all purposes.

FIELD OF THE INVENTION

This invention generally relates to an electric motor, and particularly to a DC (direct current) motor.

BACKGROUND OF THE INVENTION

Generally, a DC motor includes a stator and a rotor mounted in the stator. The stator has multiple magnetic poles. The rotor includes a rotor core having multiple teeth, a commutator having multiple segments, and a rotor winding consists of multiple coils wound on the teeth of the rotor core and connected to the segments of the commutator. The stator further includes at least one pair of brushes for contacting the segments of the commutator, thus feeding power to the rotor winding. A pair of brushes includes a positive brush and a negative brush.

A traditional six-pole nine-slot eighteen-segment motor may have eighteen coils. Each coil is wound around a single tooth of the rotor core, with two terminals connected to two adjacent segments. Since the rotor core has nine teeth, each tooth has two coils wound around it. The rotor winding of the traditional motor forms six parallel branches connected between the positive brush and the negative brush, and each branch has three coils connected in series. Since each of the coils is formed by a large number of turns, the winding process of is time-consuming, thus resulting in high cost and slow motor manufacturing process.

Further, as the number of the turns of each coil is large, the coils should be wound by wires with small diameters, e.g., 0.6 millimeter (mm) or less, which are weak and are prone to be broken during operation of the motor.

Accordingly, it would be advantageous to reduce the winding process time of the motor and improve the reliability of the motor.

SUMMARY OF THE INVENTION

Accordingly, the present invention provides a DC motor comprising a stator and a rotor rotatably mounted to the stator. The stator has 2P magnetic poles, wherein P is an integer greater than 1. The rotor comprises a rotor shaft, a rotor core and a commutator fixed to the shaft. The rotor core has a plurality of teeth defining m×P slots therebetween, wherein m is an odd integer greater than 1. The commutator comprises k×m×P segments, wherein k is an integer selected from 1 and 2. A rotor winding is received in the slots of the rotor core and connected to the segments of the commutator. The rotor winding comprises n layers of windings, wherein n is an integer smaller than P. Each layer of windings comprises k×m winding units and each winding unit comprises P coils directly connected in series. In some embodiments, the segments comprise a first set of segments, a second set of segments and a third set of segments, each segment in the first set is directly connected with n winding units, each segment in the second set is directly connected with 2n winding unit, and each segment in the third set is directly connected with none of the winding units.

In some embodiments, the rotor winding is formed by winding a single continuous wire without cutting the wire until the rotor winding is formed.

In some embodiments, each winding unit is connected to a first segment and a second segment, and the second segment is under the same magnetic polarity as another segment adjacent to the first segment.

In some embodiments, k is 2 and n is 1; and each tooth has two coils wound around it which belong to two different winding units.

In some embodiments, k is 2 and n is 2; and each tooth has four coils wound around it, which belong to four winding units. In some embodiments, of the four different winding units, two winding units are connected in parallel between a pair of segments, and the other two winding units connected in parallel between another pair of segments. In some embodiments, the rotor comprises a plurality of equalizers, and each equalizer links a group of segments under the same magnetic polarity.

In some embodiments, each coil is wound around a single tooth, and the P coils of each winding unit are wound on P teeth under the same magnetic polarity.

In some embodiments, the stator comprises at least one pair of brushes slidably contacting the segments of the commutator, each pair of brushes comprises a positive brush and a negative brush; and each layer of windings forms two parallel branches electrically connected between the at least one pair of brushes.

In some embodiments, n is 1; and the rotor winding is formed by a wire having a diameter in the range of 0.9 mm to 1.1 mm.

In some embodiments, n is 2; and the rotor winding is formed by two wires, and each wire has a diameter in the range of 0.6 mm to 0.8 mm.

In some embodiments, P is 3 and m is 3.

BRIEF DESCRIPTION OF THE DRAWINGS

The drawings illustrate the design and utility of embodiments, in which similar elements are referred to by common reference numerals. The drawings are not necessarily drawn to scale. In order to better appreciate how the above-recited and other advantages and objects are obtained, a more specific description of the embodiments will be rendered which are illustrated in accompanying drawings. These drawings depict only exemplary.

DETAILED DESCRIPTION OF VARIOUS EMBODIMENTS

Figure 1:
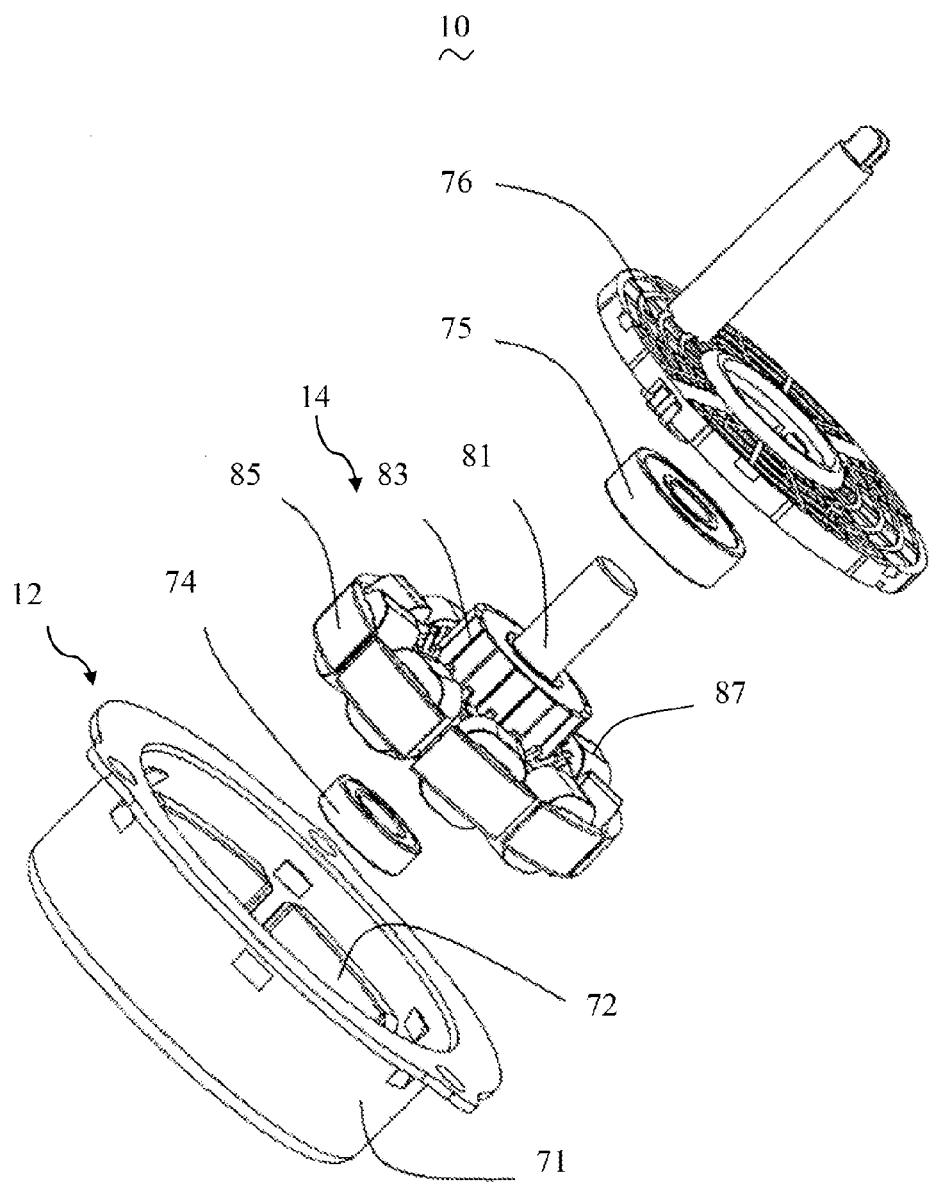
FIG. 1 illustrates a motor according to an embodiment of the present invention.
Figures 2, 4:
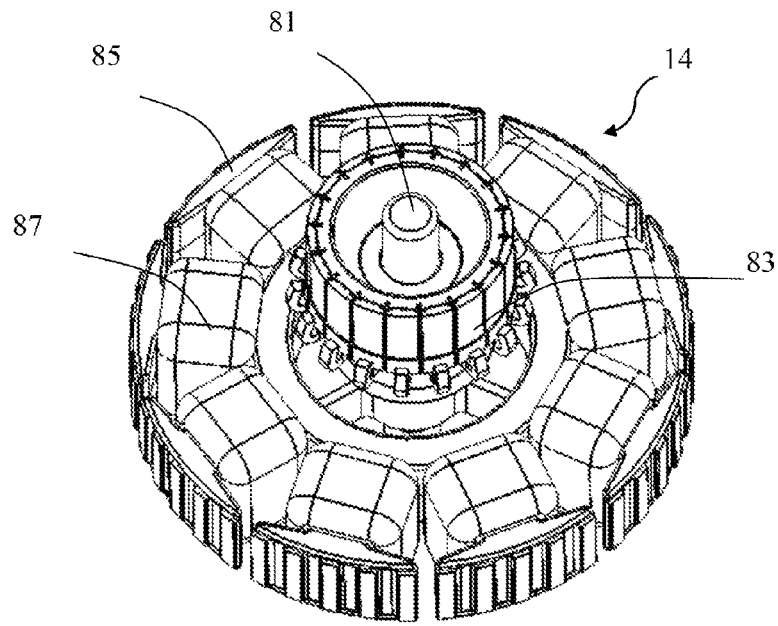
FIG. 2 illustrates a rotor of the motor shown in FIG. 1.
FIG. 4 is a winding table illustrating the connection relationships between rotor winding, rotor teeth and segments of the motor shown in FIG. 1.

Referring to FIGS. 1 and 2, a motor 10 according to an embodiment of the present invention includes a stator 12 and a rotor 14 rotatably mounted in the stator 12. The stator 12 includes a housing 71 having an opening, a plurality of magnets 72 fixed to an inner wall of the housing 71, an end cap 76 mounted to the opening of the housing 71. Two bearings 74, 75 are respectively mounted to the housing 71 and the end cap 76 for supporting the rotor 14. The magnets 72 form P pairs of magnetic poles of the stator 12, wherein P is an integer greater than 1. Thus, the stator 12 has 2P poles. A plurality of brushes (labeled as B+ and B− in FIGS. 5 and 6) are attached to the end cap 76 and electrically connected with a power source to provide power to the rotor 14.

The rotor 14 includes a rotor shaft 81, a rotor core 85 and a commutator 83 fixed to the rotor shaft 81. The rotor 14 is mounted in the stator 12 with the rotor shaft 81 rotatably supported by the bearings 74 and 75 of the stator 12, whereby the rotor 14 is rotatable relative to the stator 12.

The rotor core 85 has in m×P teeth, wherein in is an odd integer greater than 1. Each two adjacent teeth of the rotor core 85 are spaced from each other to define a winding slot there between. Therefore, the rotor core 85 defines m×P winding slots between the teeth.

The commutator 83 has k×(m×P) conductive segments, wherein k is an integer selected from 1 and 2. The commutator segments slidably contact the brushes of the stator 12, to receive power from the brushes.

In one specific embodiment, the magnets 72 of the stator 12 form six magnetic poles, i.e., three pairs of magnetic poles. The rotor core 85 has nine teeth defining nine winding slots, and the commutator 83 has eighteen segments. That is, P=3, m=3, and k=2.

A rotor winding 87 is wound on the teeth of the rotor core 85 and connected to the segments of the commutator 83. The rotor winding 87 includes a plurality of coils each of which has multiple turns wound on a single tooth in one direction. In accordance with a preferred embodiment of the present invention, the number of the coils is equal to the number of the segments, and is represented by k×(m×P). In one specific embodiment, the rotor winding 87 includes eighteen coils.

Figure 3:
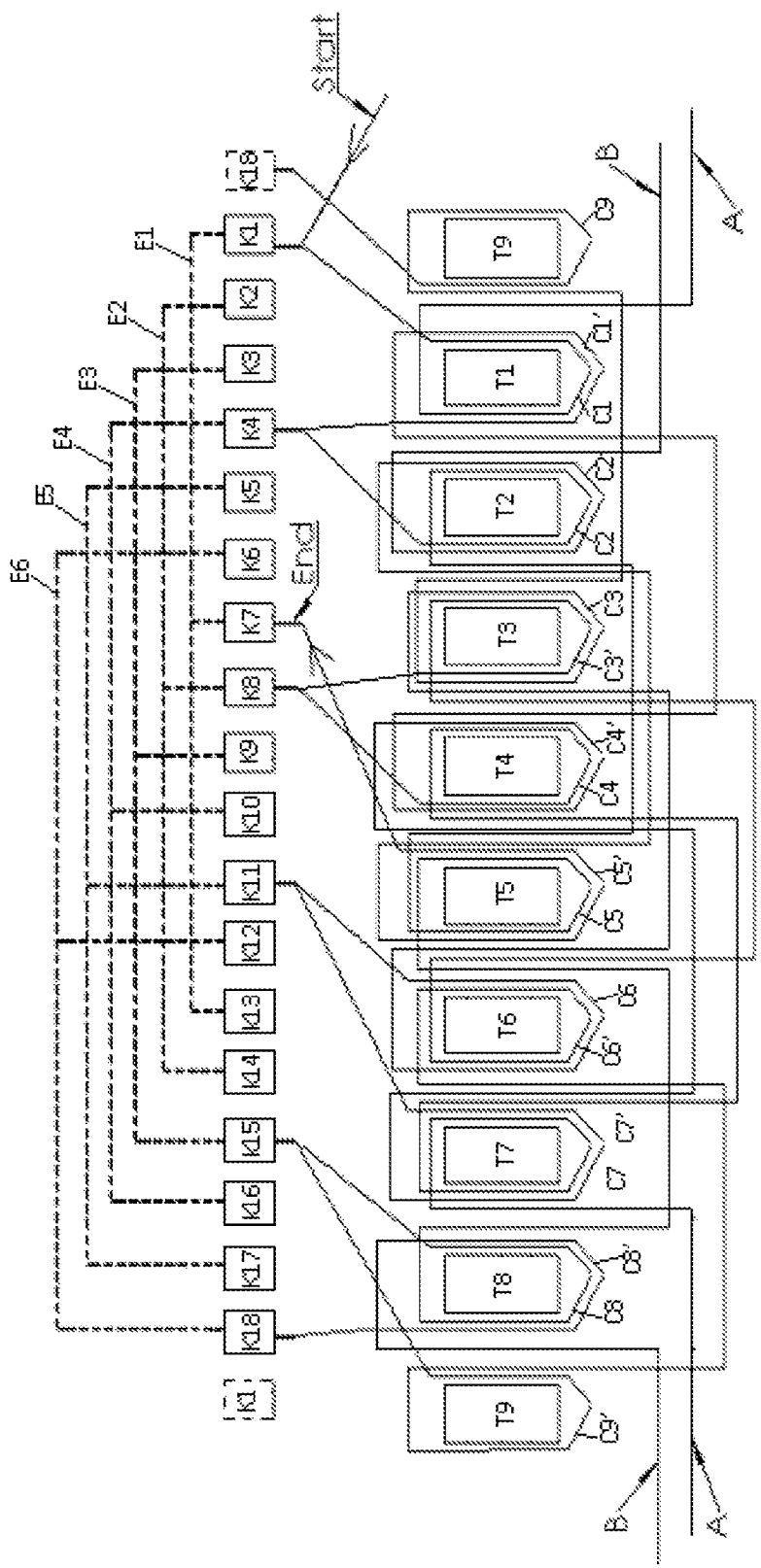
FIG. 3 is a winding schematic of the rotor shown in FIG. 2.

FIG. 3 is a developed winding diagram illustrating the rotor 14 shown in FIG. 2, with the components of the rotor 14 laid out linearly. The teeth T1-T9, the commutator segments K1-K18, and the winding coils C1-C9 and C1'-C9' are shown schematically. The segments k1-K18 of the commutator 83 are laid flat along the top row. The Segment K1 is repeated at the front of the row and the segment K18 is repeated at the end of the row for illustrative purposes. The teeth T1-T9 are laid flat along the bottom row beneath the commutator segments K1-K18. The tooth T9 is repeated at the end of the row for illustrative purposes. The coils C1-C9 are shown wound clockwise around the teeth T1-T9 and the coils C1'-C9' are shown wound counter-clockwise around the teeth T1-T9. As shown in FIG. 3, each tooth Tn has two coils wound around it, namely, coils Cn and Cn', wherein n is a number between 1 and 9.

The commutator 83 has six equalizers E1-E6, and each equalizer links together or short circuit a group of commutator segments which are under the same magnetic polarity. As is used in the specification and the appended claims, the segments under the same magnetic polarity means that the segments are angularly separated from each other by the angular distance between magnetic poles of same polarity.

The eighteen commutator segments K1-K18 are divided into six groups, and the segments in each group are electrically connected together by a corresponding one of the equalizers E1-E6, thereby allowing the motor 10 to operate even though the number of brushes are less than the number of stator poles 2 P, while normally one would expect the number of brushes is equal to the number of stator poles. In accordance with a specific embodiment, there are three commutator segments in each group evenly spaced from each other along a circumference of the commutator 83.

In accordance with the specific embodiment the teeth T1-T9 are sorted into three groups, and each group includes three teeth under the same magnetic polarity. That is, the teeth of each group are angularly separated from each other by the angular distance between poles of same magnetic polarity. As such, the number of teeth in each group is equal to the number of poles of same magnetic polarity which is represented by P. The teeth in each group are equally spaced along a circumference of the rotor core 85. In particular, the teeth T1, T4 and T7 belong to a first group. The teeth T2, T5 and T8 belong to a second group. The teeth T3, T6 and T9 belong to a third group.

Referring also to FIG. 4, the winding process in accordance with one specific embodiment is described herein below. Winding starts with connecting one end of an armature wire to a commutator segment, e.g., K1. The wire is then wound around each tooth of the first group in sequence in a clockwise (CW) direction. More specifically, the wire is wound CW around the tooth T1 to form coil C1, then wound CW around tooth T7 to form coil C7, and wound CW around tooth T4 to form coil C4. The wire is then connected to segment K8. Therefore, the coils C1, C7 and C4 are directly connected in series, and are collectively referred as a winding unit WA.

Then the wire is wound around each tooth of the third group in sequence in a counter-clockwise (CCW) direction continuously from the segment K8 without cutting the wire. More specifically, the wire is wound CCW around the tooth T3 to form coil C3', then wound CCW around tooth T6 to form coil C6', and wound CCW around tooth T9 to form coil C9', and then the wire is connected to segment K15. Therefore, a winding unit WB' is formed by the coils C3', C6' and C9' which are directly connected in series.

Then the wire is wound CW around each tooth of the second group continuously from the segment K15 without cutting the wire. More specifically, the wire is wound CW around teeth T8, T5 and T2 in sequence to form coils C8, C5 and C2 in turn, and then the wire is connected to the segment K4, thereby forming a winding unit WC.

Then the wire is wound CCW around each tooth of the first group continuously from the segment K4 without cutting the wire. Specifically, the wire is wound CCW around teeth T1, T4 and T7 in sequence to form coils C1', C4' and C7' in turn, and then the wire is connected to the segment K11, thereby forming a winding unit WA'.

Then the wire is wound CW around each tooth of the third group continuously from the segment K11 without cutting the wire. Specifically, the wire is wound CW around teeth T6, T3 and T9 in sequence to form coils C6, C3 and C9 in turn, and then connected to the segment K18, thereby forming a winding unit WB.

Then the wire is wound CCW around each tooth of the second group continuously from the segment K18 without cutting the wire. Specifically, the wire is wound CCW around teeth T8, T2 and T5 in sequence to form coils C8', C2' and C5' in turn. Then the wire is terminated on the segment K7 such that a winding unit WC' is formed and the windings process is finished. Therefore, the rotor winding 87 is wound by a single continuous wire which is not cut until the winding process is finished.

As described above, the rotor winding 87 of the motor 10 has six winding units, and each winding unit has three coils.

In this embodiment, the winding units are different from each other either in the teeth that the winding units are wound around, or in the directions the winding units are wound. Such a rotor winding is referred as a single layer winding. It can be understood that, if a rotor winding has multiple pairs of winding units with each pair including two winding units wound around the same teeth in the same direction, the rotor winding is referred as a double layer winding.

It can be noted that, for rotor 14 having a single layer winding 87 in the present invention, the number of coils of each winding unit is equal to the number of the teeth of each group, which is represented by P. The number of the winding units is thus represented by k×m.

In the present invention, each winding unit is directly connected to only two segments, one of which is linked to another segment adjacent to the other one of the two segments by a corresponding equalizer. For example, the winding unit WA is connected to the segments K1 and K8. The segment K8 is linked by equalizer E2 to the segment K2 which is adjacent to the segment K1. Therefore, it can be understood that the winding unit WA can be alternatively connected to K1 and K14, which is also linked to the segment K2 by the equalizer E2. Likewise, the segment K1 is linked by equalizer E1 to the segment K7 which is adjacent to the segment K8. Therefore, it can be understood that the winding unit WA can be alternatively connected to K8 and K13, which is also linked to the segment K1 by the equalizer E1. In other words, each winding unit in the rotor winding 87 can be directly connected to two segments belong to two groups, and the segments in one of the two groups are adjacent to corresponding segments in the other group.

As shown in FIG. 3 and described in FIG. 4, the segments are sorted into three sets or categories. The first set or category includes the segments K1 and K7 that are directly connect to one winding unit. The second set or category includes segments K8, K15, K4, K11, and K18 that are directly connected to two winding units wound in opposite directions. The third set or category includes remaining segments K2, K3, K5, K6, K9, K10, K12, K13, K14, K16, and K17 that not directly connected to any winding unit.

It can be noted that, two winding units that are wound on the same group of teeth are wound in opposite directions. Namely, one of such winding units is wound in clockwise direction, and the other winding unit is wound in counterclockwise direction. The two winding units are connected to different segments. Therefore, the two winding units wound on the same group of teeth are connected to four segments.

Figure 5:
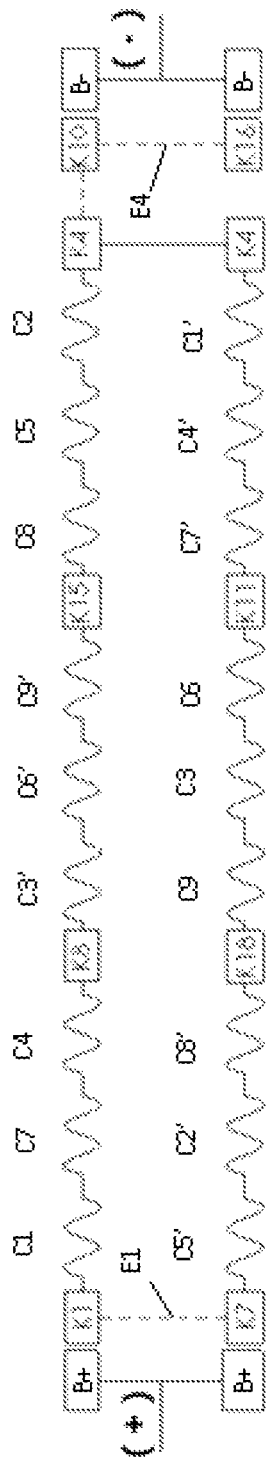
FIG. 5 illustrates electrical connection relationships of the rotor winding, segments and brushes of the motor shown in FIG. 1.

FIG. 5 illustrates the electrical connection relationship of the rotor winding 87, the segments of the commutator 83, and the brushes of the motor 10. The motor 10 has two pairs of brushes, each pair includes a positive brush represented by B+ and a negative brush represented by B−. As shown in FIG. 5, the rotor winding 87 of the motor 10 forms two parallel branches connected between the positive brushes and negative brushes. Each branch includes nine coils connected in series, which is three times the number of coils in each branch of the traditional six-pole, nine slot and eighteen-segment motor.

As is known to all in the art, the performance of the motor 10 according to the present invention will be substantially equal to that of a traditional motor if the total turns of all the coils in each branch are the same in the two motors. Therefore, the number of turns of each coil of the motor 10 in the present embodiment can be one third (⅓) of the number of turns of each coil of the traditional motor while substantially maintaining the same level of performance. Due to the significantly reduction of the turns of each coil, the winding time of the motor 10 in the present embodiment is reduced significantly, and the coils can be wound by a wire with a diameter larger than that of the wire used in the traditional motor. For example, the wire used in the present invention may have a diameter in the range of 0.9 millimeter (mm) to 1.1 mm, wherein 1.0 mm is preferred. As such, the coils of the motor 10 in the present invention are stronger than those of the traditional motor, and thus the motor 10 of the present invention is more reliable than the traditional motor.

Figure 6:
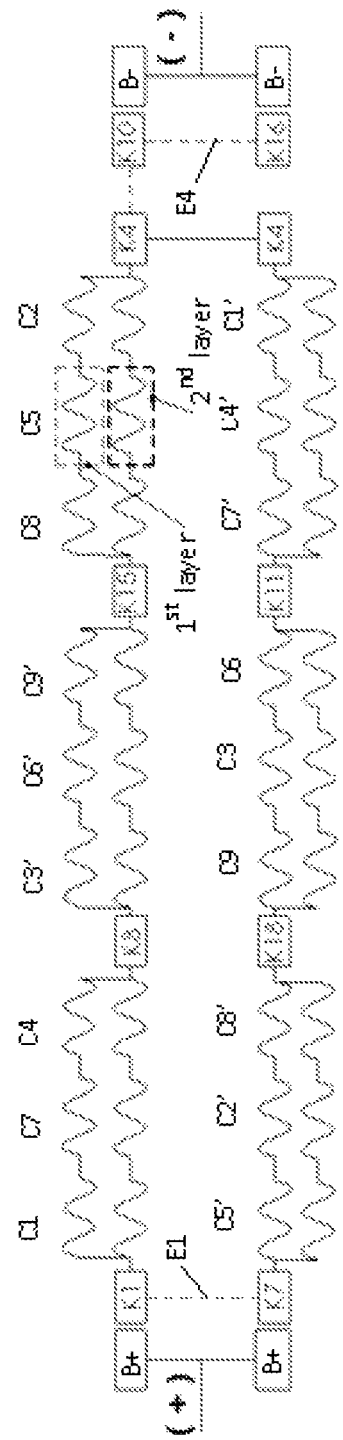
FIG. 6 illustrates electrical connection relationships of the rotor winding, segments and brushes of a motor according to another embodiment of the present invention.

FIG. 6 illustrates the electrical connection relationship of the rotor winding 87, the commutator segments, and the brushes of a motor according to another embodiment of the present invention. The rotor winding 87 shown in FIG. 6 differs from the above embodiment in that it has double layers, i.e., a first winding layer and a second winding layer identical to each other. More specifically, each group of teeth has two identical winding units wound around them in the same direction, and the two winding units are connected to the same pair of segments. This rotor winding 87 can be achieved by winding two wires simultaneously as though the two wires are considered as a single wire like that used in the motor 10 of the above embodiment. In that case, the first winding layer and the second winding layer are formed simultaneously. Alternatively, the rotor winding 87 can be formed by winding the first winding layer and the second winding layer in sequence.

In this embodiment, the number of the winding units is double of the number of the winding units of the above embodiment, while the number of coils of each winding unit remains the same. Thus, the total number of the coils in this embodiment is double of the total number of the coils in the above embodiment. The total number of the coils is represented by n×k×m×P (n represents the number of layers of the winding).

As shown in FIG. 6, the rotor winding 87 forms four parallel branches connected between the positive brushes and the negative brushes. In the present embodiment, the winding wire may have a diameter in the range of 0.6 mm to 0.8 mm, wherein 0.7 mm will be preferred. Since the first winding layer and the second winding layer are electrically connected in parallel. If one of the winding units in the first layer is open circuited, the current is still conducted by the second winding layer in the other identical winding unit. Therefore, the motor 10 is more reliable and safer compared to the traditional motor. It should be pointed out that, a coil is said to be open circuited or open when the wire forming the coil is broken such that current can not flow through the coil from one segment to another segment.

In the embodiment, each group of teeth has four winding units wound around it, of which two winding units are identical and collectively connected to a pair of segments, and the other two winding units are identical and collectively connected to another pair of segments.

Although the invention is described by embodiments of six-pole, nine-slot commutated motor, it can be understood that the prevent invention can also be applicant to another commutated motor with the pole number and slot number different from those disclosed in the embodiments, such as four-pole, six-slot commutated motors.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A DC motor comprising:
a stator having 2P magnetic poles, wherein P is an integer greater than 1; and
a rotor rotatably mounted to the stator and comprising:
a rotor shaft;
a rotor core fixed to the rotor shaft and having a plurality of teeth defining m×P slots, wherein m is an odd integer greater than 1;
a commutator fixed to the rotor shaft, adjacent to the rotor core, and having k×m×P segments, wherein k is an integer selected from 1 and 2;
a rotor winding received in the slots of the rotor core and connected to the segments of the commutator, the rotor winding comprising n layers of windings, wherein n is an integer smaller than P; each layer of windings comprising k×m winding units and each winding unit comprising P coils directly connected in series,
wherein the segments comprise a first set of segments, a second set of segments and a third set of segments, each segment in the first set is directly connected with n winding units, each segment in the second set is directly connected with 2n winding unit, and each segment in the third set is directly connected with none of the winding units, and wherein:
k is 2 and n is 2; and
each tooth has four coils wound around it, which belong to four winding units.

2. The DC motor of claim 1, wherein the rotor winding is formed by winding a single continuous wire without cutting the wire until the rotor winding is formed.

3. The DC motor of claim 1, wherein each winding unit is connected to a first segment and a second segment, and the second segment is under the same magnetic polarity as another segment adjacent to the first segment.

4. The DC motor of claim 1, wherein of the four winding units, two winding units are connected in parallel between a pair of segments, and the other two winding units connected in parallel between another pair of segments.

5. The DC motor of claim 4, wherein the rotor comprises a plurality of equalizers, and each equalizer links a group of segments under the same magnetic polarity.

6. The DC motor of claim 1, wherein each coil is wound around a single tooth, and the P coils of each winding unit are wound on P teeth under the same magnetic polarity.

7. The DC motor of claim 1, wherein:
the stator comprises at least one pair of brushes slidably contacting the segments of the commutator, each pair of brushes comprises a positive brush and a negative brush; and
each layer of windings forms two parallel branches electrically connected between the at least one pair of brushes.

8. The DC motor of claim 1, wherein
the rotor winding is formed by two wires, and each wire has a diameter in the range of 0.6 millimeter (mm) to 0.8 mm.

9. The DC motor of claim 1, wherein P is 3 and m is 3.

10. The DC motor of claim 1, wherein the rotor winding is formed by winding a wire having a diameter in the range of 0.9 millimeter (mm) to 1.1 mm.

11. A DC motor comprising:
a stator having 2P magnetic poles, wherein P is an integer greater than one; and
a rotor rotatably mounted to the stator and comprising:
a rotor shaft;
a rotor core fixed to the rotor shaft and having a plurality of teeth defining m×P slots therebetween, wherein m is an odd integer greater than 1;
a commutator fixed to the rotor shaft and having k×m×P segments, wherein k is an integer selected from 1 and 2;
a rotor winding received in the slots of the rotor core and connected to the segments of the commutator, the rotor winding comprising k×m winding units, each winding unit connected to only two segments and comprising P coils directly connected in series between the two segments,
wherein the segments comprise a first set of segments, a second set of segments and a third set of segments, each segment in the first set is directly connected with n winding units, each segment in the second set is directly connected with 2n winding unit, and each segment in the third set is directly connected with none of the winding units, and wherein n is 2, and the rotor winding is formed by two wires, and each wire has a diameter in the range of 0.6 millimeter (mm) to 0.8 mm.

12. The DC motor of claim 11, wherein the segments comprise a first set of segments, a second set of segments, and a third set of segments, each segment in the first set is directly connected with two winding units, each segment in the second set is directly connected with only one winding unit, and each segment in the third set is directly connected with none of the winding units.

13. The DC motor of claim 11, wherein each winding unit is connected to a first segment and a second segment, and the second segment is under the same magnetic polarity as a third segment adjacent to the first segment.

14. The DC motor of claim 13, wherein the rotor comprises a plurality of equalizers, and each equalizer links a group of segments under the same magnetic polarity.

15. The DC motor of claim 11, wherein each coil is wound around a single tooth, and the P coils of each winding unit are wound on P teeth under the same magnetic polarity.

16. The DC motor of claim 11, wherein:
the stator comprises at least one pair of brushes slidably contacting the segments of the commutator, each pair of brushes comprises a positive brush and a negative brush; and
the rotor winding forms two parallel branches electrically connected between the at least one pair of brushes.

17. The DC motor of claim 11, wherein P is 3 and m is 3.

* * * * *